US007751610B2

(12) United States Patent
Takarada

(10) Patent No.: US 7,751,610 B2
(45) Date of Patent: Jul. 6, 2010

(54) IMAGE RECOGNITION METHOD AND IMAGE RECOGNITION APPARATUS

(75) Inventor: Shinichi Takarada, Ehime (JP)

(73) Assignee: Panasonic Corporation, Osaka (JP)

( * ) Notice: Subject to any disclaimer, the term of this patent is extended or adjusted under 35 U.S.C. 154(b) by 996 days.

(21) Appl. No.: 11/076,860

(22) Filed: Mar. 11, 2005

(65) Prior Publication Data

US 2005/0201622 A1 Sep. 15, 2005

(30) Foreign Application Priority Data

Mar. 12, 2004 (JP) ............... 2004-071382

(51) Int. Cl.
*G06K 9/00* (2006.01)
*G06K 9/62* (2006.01)
*G06K 9/68* (2006.01)

(52) U.S. Cl. .............. 382/144; 382/145; 382/146; 382/147; 382/148; 382/149; 382/150; 382/209; 382/219

(58) Field of Classification Search ............ None
See application file for complete search history.

(56) References Cited

U.S. PATENT DOCUMENTS

| 3,755,812 | A | * | 8/1973 | Bechtel et al. ............ 342/161 |
| 4,347,479 | A | * | 8/1982 | Cullet ..................... 324/716 |
| 4,613,894 | A | * | 9/1986 | Catros et al. ............. 348/700 |
| 4,635,289 | A | * | 1/1987 | Doyle et al. .............. 382/147 |
| 4,673,977 | A | * | 6/1987 | Stelzenmuller ........ 375/240.01 |
| 4,737,920 | A | * | 4/1988 | Ozawa ..................... 716/5 |
| 5,033,100 | A | * | 7/1991 | Hara et al. ................ 382/130 |
| 5,049,997 | A | * | 9/1991 | Arai ....................... 348/364 |
| 5,067,162 | A | * | 11/1991 | Driscoll et al. ............ 382/126 |
| 5,073,857 | A | * | 12/1991 | Peters et al. .............. 382/133 |
| 5,123,054 | A | * | 6/1992 | Hara et al. ................ 382/130 |
| 5,148,375 | A | * | 9/1992 | Horikami .................. 382/150 |
| 5,159,667 | A | * | 10/1992 | Borrey et al. ............. 715/205 |
| 5,204,627 | A | * | 4/1993 | Mistretta et al. ........... 324/309 |
| 5,233,413 | A | * | 8/1993 | Fuchsberger .............. 358/518 |
| 5,331,442 | A | * | 7/1994 | Sorimachi ................ 358/532 |
| 5,359,513 | A | * | 10/1994 | Kano et al. ............... 382/128 |
| 5,361,141 | A | * | 11/1994 | Aoyama .................. 358/452 |

(Continued)

FOREIGN PATENT DOCUMENTS

JP        4-174309        6/1992

(Continued)

*Primary Examiner*—Vikkram Bali
*Assistant Examiner*—Michelle Entezari
(74) *Attorney, Agent, or Firm*—Wenderoth, Lind & Ponack, L.L.P.

(57) ABSTRACT

Provided is an image recognition method in which a first pattern area which is set inside a target to be recognized and a second pattern area which is set outside the target are used as a mask pattern. When a comparison circuit judges that a difference obtained by subtracting, by a differential circuit, the largest luminance value in the target image contained in the first pattern area, which is detected by a largest value detection circuit, from the smallest luminance value in the target image contained in the second pattern area, which is detected by the smallest value detection circuit, is larger than a certain offset amount, the matching judgement that a predetermined pattern is present is made. This recognition judgment is performed with the whole target image being scanned.

15 Claims, 6 Drawing Sheets

In a case where Min(408 to 411)−Max(404 to 407)>a constant, pattern is detected

U.S. PATENT DOCUMENTS

| | | | | |
|---|---|---|---|---|
| 5,410,250 | A * | 4/1995 | Brown | 324/309 |
| 5,440,649 | A * | 8/1995 | Kiyasu et al. | 382/147 |
| 5,442,397 | A * | 8/1995 | Yoshimura et al. | 348/363 |
| 5,621,811 | A * | 4/1997 | Roder et al. | 382/147 |
| 5,724,456 | A * | 3/1998 | Boyack et al. | 382/274 |
| 5,825,919 | A * | 10/1998 | Bloomberg et al. | 382/177 |
| 5,864,127 | A * | 1/1999 | Jackson et al. | 235/454 |
| 5,872,864 | A * | 2/1999 | Imade et al. | 382/176 |
| 5,907,628 | A * | 5/1999 | Yolles et al. | 382/149 |
| 5,907,629 | A * | 5/1999 | Funt et al. | 382/162 |
| 5,912,985 | A * | 6/1999 | Morimoto et al. | 382/151 |
| 5,930,406 | A * | 7/1999 | Itsuzaki et al. | 382/291 |
| 5,943,437 | A * | 8/1999 | Sumie et al. | 382/149 |
| 5,949,905 | A * | 9/1999 | Nichani et al. | 382/173 |
| 5,982,927 | A * | 11/1999 | Koljonen | 382/168 |
| 5,995,663 | A * | 11/1999 | Itsuzaki et al. | 382/203 |
| 6,137,899 | A * | 10/2000 | Lee et al. | 382/133 |
| 6,181,839 | B1 | 1/2001 | Kannon et al. | 382/312 |
| 6,330,354 | B1 * | 12/2001 | Companion et al. | 382/150 |
| 6,512,507 | B1 * | 1/2003 | Furihata et al. | 345/157 |
| 6,539,106 | B1 * | 3/2003 | Gallarda et al. | 382/149 |
| 6,609,021 | B1 * | 8/2003 | Fan et al. | 600/425 |
| 6,720,965 | B1 * | 4/2004 | Hirosawa et al. | 345/423 |
| 6,728,401 | B1 * | 4/2004 | Hardeberg | 382/167 |
| 6,813,367 | B1 * | 11/2004 | Bhattacharjya | 382/100 |
| 6,853,743 | B2 * | 2/2005 | Kotani et al. | 382/144 |
| 6,898,303 | B2 * | 5/2005 | Armato et al. | 382/131 |
| 7,064,793 | B2 * | 6/2006 | Hahn et al. | 348/619 |
| 7,099,510 | B2 * | 8/2006 | Jones et al. | 382/225 |
| 7,110,658 | B1 * | 9/2006 | Iggulden et al. | 386/46 |
| 7,120,280 | B2 * | 10/2006 | Biswas et al. | 382/124 |
| 7,149,338 | B2 * | 12/2006 | Takai et al. | 382/141 |
| 2001/0030642 | A1 * | 10/2001 | Sullivan et al. | 345/157 |
| 2002/0047990 | A1 * | 4/2002 | Fergason et al. | 351/208 |
| 2002/0054210 | A1 * | 5/2002 | Glier et al. | 348/149 |
| 2002/0084330 | A1 * | 7/2002 | Chiu | 235/462.11 |
| 2002/0181756 | A1 * | 12/2002 | Shibuya et al. | 382/145 |
| 2003/0099387 | A1 * | 5/2003 | Doi et al. | 382/131 |
| 2003/0138133 | A1 * | 7/2003 | Nagaoka et al. | 382/104 |
| 2003/0169442 | A1 * | 9/2003 | Yokochi | 358/1.9 |
| 2003/0202697 | A1 * | 10/2003 | Simard et al. | 382/195 |
| 2003/0219151 | A1 * | 11/2003 | Curry et al. | 382/129 |
| 2004/0001632 | A1 * | 1/2004 | Adachi | 382/224 |
| 2004/0036924 | A1 * | 2/2004 | Ihara | 358/3.28 |
| 2004/0041794 | A1 * | 3/2004 | Kidode et al. | 345/173 |
| 2004/0101173 | A1 * | 5/2004 | Hara et al. | 382/124 |
| 2004/0131236 | A1 * | 7/2004 | Chen et al. | 382/118 |
| 2004/0170308 | A1 * | 9/2004 | Belykh et al. | 382/128 |
| 2004/0206882 | A1 * | 10/2004 | Banks et al. | 250/201.2 |
| 2005/0231421 | A1 * | 10/2005 | Fleisher et al. | 342/179 |
| 2006/0014082 | A1 * | 1/2006 | Ogawa | 430/5 |
| 2006/0045386 | A1 * | 3/2006 | Fukuoka et al. | 382/305 |

FOREIGN PATENT DOCUMENTS

| | | |
|---|---|---|
| JP | 11-132959 | 5/1999 |
| JP | 11-239271 | 8/1999 |

* cited by examiner in a case where Min(408 to 411)−Max(404 to 407)>a constant, pattern is detected

IMAGE RECOGNITION METHOD AND IMAGE RECOGNITION APPARATUS

BACKGROUND OF THE INVENTION

1. Field of the Invention

The present invention relates to a method and an apparatus for performing a characterization with using an optical means and processing an image for recognition, and more particularly, to a technique for photographing a target to be photographed as image data of a plurality of gradations, extracting a target to be noted from the image and performing binarization.

2. Description of the Related Art

Conventionally, various methods for recognizing images have been suggested. The methods are executed for various purposes such as for searching an image for a specific pattern or for checking whether the target detected from the image has a normal shape. While the purposes are various, however, a method in which a target image is compared with a specific template image as a reference in some manner and the resultant is numerically evaluated, and thereby how much the target image matches the template image is checked is typically taken as the technique.

Hereinafter, a typical image recognition method which is very widespread will be described with reference to FIGS. 9 and 10. FIG. 9 illustrates an example of a process of a typical template matching in the image recognition method. In FIG. 9, a reference numeral 201 denotes a template image which is used for searching the target image 202 for a round image pattern indicated in the template image 201. Many round patterns as designated by the reference numerals 203 and 204 are present in the target image 202.

The template image 201 is 50 pixels high and 50 pixels wide. The target image 202 is 480 pixels high and 640 pixels wide, and each pixel has any of 256 gradations.

The target image 202 is sequentially searched, and thereby a round image pattern indicated in the template image is extracted from the target image 202. Initially, it is assumed that a frame of the same size as the template image 201 is positioned in a frame 205 in the upper left of the target image 202, and 50 pixels in height and 50 pixels in width are extracted from the target image 202.

Next, a process flow of the typical template matching shown in FIG. 9 will be described with reference to FIG. 10. In the process step 301, the template image 201 is superimposed on the portion 205 of the target image, and the pixels at the corresponding positions are subjected to difference operation for each pixel.

Next, in the process step S302, the resultants of the difference operations for the 50×50 pixels are individually squared, and then all the resultants of squaring are added. The value indicates correlation between both images, and the value is small when both images are the same while the value is large when both images are different from each other.

The comparator 304 compares the value 302 with a correlation threshold value 303, and when the obtained value is smaller than the correlation threshold value 303, it is judged that a specific pattern is detected while when the obtained value is larger than the correlation threshold value 303, it is judged that there is no specific pattern.

In FIG. 9, the judgement is made at the position of the partial image 205, and then the frame is one pixel displaced to the right in the image and the similar judgement is made, and this is repeated and thereby the judgements are sequentially made for the whole target image 202 in the order of the arrow 206. When the frame is positioned at 207, the template 201 matches the pattern 203, and the sum of the squares of the respective resultants 302 of the difference operation 301 is a very small value, and therefore it can be judged that a round pattern is present.

However, this method has a large problem. That is, the first problem is a problem of an amount of operation. In this example, since each judgement is made in units of 50 pixels, the subtraction, the square operation, and the addition are required to be performed 2500 times, 2500 times and 2499 times, respectively. Moreover, it is necessary to perform each of the above operations 590×430 times for the whole image. Accordingly, the amount of operation becomes very large and the time for the judgement becomes longer.

The second problem is a problem caused by a non-uniformity of a light. For example, in FIG. 9, the illumination on the target image 202 is non-uniform, and it is a little lighter on the right in the image. At this time, the pattern 204 and its adjacent background are also lighter, and when a difference from the template is obtained, the difference due to the non-uniformity of the brightness remains involved in all the pixels, and there is a possibility that the judgement is incorrectly made.

In order to solve the problems, for example, there is a suggestion disclosed in the Japanese Published Patent Application No. Hei.11-132959. It is disclosed therein that an adjacent actual image is used as a template, and a means for correcting brightness is provided so as to correct a luminance, and then a target image is compared with the template, thereby eliminating an influence due to the brightness.

The prior art image recognition method and image recognition apparatus are constructed as described above, in which while a processing for eliminating an influence due to non-uniformity of a light can be performed, the amount of operation cannot be reduced, and further an operation for correcting brightness is required, and thereby there is a problem that the processing load becomes more massive. Moreover, since an actual image is used as a template, the additions of the differences become larger due to an influence of a noise, thereby potentially leading to an incorrect judgement.

SUMMARY OF THE INVENTION

The present invention is made to solve the above-described problems and has for its object to provide an image recognition method and an image recognition apparatus which can securely extract a desired pattern from an image with the amount of operations which is extremely reduced.

Other objects and advantages of the invention will become apparent from the detailed description that follows. The detailed description and specific embodiments described are provided only for illustration since various additions and modifications within the spirit and scope of the invention will be apparent to those of skill in the art from the detailed description.

According to a 1st aspect of the present invention, there is provided an image recognition method in which a mask pattern indicating characteristics of image patterns be recognized is used to recognize the image patterns from the target image data having digitized gradations of two or more values, comprising: said mask pattern having a first pattern area and a second pattern area; obtaining a first representative value which is a luminance of the target image data from the first pattern area; obtaining a second representative value which is a luminance of the target image data from the second pattern area; and judging that an image to be recognized is present in the target image when a result of comparison between the first and the second representative values satisfies a predetermined condition.

Therefore, a desired pattern can be reliably extracted with a small amount of operation.

According to a 2nd aspect of the present invention, in the image recognition method of the 1st aspect, as the mask pattern to be used, the first pattern area in the mask pattern is positioned inside the second pattern area, and the first and second pattern areas are composed of a plurality of pixels.

According to a 3rd aspect of the present invention, in the image recognition method of the 1st aspect, the first representative value is the largest value of the luminances of the target image data, which are obtained from the first pattern area, and the second representative value is the smallest value of the luminances of the target image data, which are included in the second pattern area.

According to a 4th aspect of the present invention, in the image recognition method of the 3rd aspect, when the difference between the second representative value and the first representative value is equal to or larger than a predetermined threshold value as the predetermined condition, it is judged that the image to be recognized is present in the target image.

According to a 5th aspect of the present invention, in the image recognition method of the 1st aspect, the first representative value is an average value of the luminances of the target image data, which are obtained from the first pattern area, and the second representative value is an average value of the luminances of the target image data, which are obtained from the second pattern area.

According to a 6th aspect of the present invention, in the image recognition method of the 5th aspect, when the difference between the second representative value and the first representative value is equal to or larger than a predetermined threshold value as the predetermined condition, it is judged that the image to be recognized is present in the target image.

According to a 7th aspect of the present invention, in the image recognition method of the 1st aspect, the first representative value is a primary largest value and a primary average value of the luminances of the target image data, which are obtained from the first pattern area, and the second representative value is a secondary largest value and a secondary average value of the luminances of the target image data, which are obtained from the second pattern area.

According to an 8th aspect of the present invention, in the image recognition method of the 7th aspect, when the difference between the secondary largest value and the primary largest value is equal to or larger than the first predetermined threshold value and the difference between the secondary average value and the primary average value is equal to or larger than the second predetermined threshold value as the predetermined condition, it is judged that the image to be recognized is present in the target image.

According to a 9th aspect of the present invention, the image recognition method of the 1st aspect comprises enlarging or reducing the first pattern area and the second pattern area at the same ratio, and sequentially evaluating the degrees of matching at the respective positions with the positions of the mask patterns being displaced relative to the target image data, using the mask patterns of a plurality of sizes.

Therefore, even when the targets for which it is judged whether the patterns are present or not have a plurality of sizes, it can be correctly judged whether the pattern is present or not.

According to a 10th aspect of the present invention, the image recognition method of the 1st aspect comprises turning the first pattern area and the second pattern area by the same angle, and sequentially evaluating the degrees of matching at the respective positions with the positions of the mask patterns being displaced relative to the target image data, using the mask patterns which are obtained by turning the mask pattern multiple times.

Therefore, even when a target to be recognized is not positioned at a predetermined angle, the target can be recognized with high precision.

According to an 11th aspect of the present invention, the image recognition method of the 1st aspect comprises enlarging or reducing the target image data, and sequentially evaluating the degrees of matching at the respective positions with the positions of the mask patterns being displaced relative to the target image data, using the target image data and the mask patterns which have plural sizes.

According to a 12th aspect of the present invention, the image recognition method of the 1st aspect comprises turning the mask pattern, and sequentially evaluating the degrees of matching at the respective positions with the relative positions between the mask patterns and the target image data being displaced, using the mask patterns at multiple turning angles which are obtained by turning the mask pattern.

According to a 13th aspect of the present invention, the image recognition method of the 1st aspect comprises a plurality of combinations of the first pattern area and the second pattern area, and sequentially evaluating the degrees of matching at the respective positions with the positions of the mask patterns being displaced relative to the target image data, using the plurality of mask patterns.

According to a 14th aspect of the present invention, the image recognition method of any of the 1st to 13th aspects comprises discriminating a position where a specific image pattern in the target image data is present and binarize the target image data in the vicinity of the position.

According to a 15th aspect of the present invention, the image recognition method of the 14th aspect comprises a binarized area having a positional relationship which is fixed relative to the first pattern area and the second pattern area, and binarizing the target image data in the binarized area when the image pattern is judged as being present.

According to a 16th aspect of the present invention, the image recognition method of the 15th aspect comprises obtaining a threshold value on the basis of the representative value of the luminance of the target image data in the first pattern area and the representative value of the luminance of the target image data in the second pattern area, and binarizing the target image data in the binarized area using the threshold value.

According to a 17th aspect of the present invention, in the image recognition method of the 16th aspect, an intermediate value between the representative value of the luminance of the target image data in the first pattern area and the representative value of the luminance of the target image data in the second pattern area is used as the threshold value.

According to an 18th aspect of the present invention, in the image recognition method of the 16th aspect, an intermediate value between the largest value of the luminances of the target image data, which are contained in the first pattern area, and the smallest value of the luminances of the target image data, which are contained in the second pattern area, is used as the threshold value.

According to a 19th aspect of the present invention, the image recognition method of the 14th aspect comprises a fixed value area having a positional relationship which is fixed relative to the first pattern area, the second pattern area, and the binarized area, and binarizing the target image data in the fixed value area so that the target image data have a predetermined one of two values when the image pattern is judged as being present.

According to a 20th aspect of the present invention, in the image recognition method of any of the 14th to 19th aspects, the portion which is not binarized is set to a predetermined one of the two values to obtain the binarization result of the whole image.

According to a 21st aspect of the present invention, there is provided an image recognition apparatus which uses the image recognition method of any of the 1st to 20th aspects to process an image, and which comprises a display unit for displaying the first pattern area and the second pattern area on a screen, and a position specification unit for determining positions of the respective pixels in the first pattern area and the second pattern area on the screen.

According to a 22nd aspect of the present invention, the image recognition apparatus of the 21st aspect comprises an edition unit for overlay-displaying the first pattern area and the second pattern area on the displayed image of the target image data to edit the first pattern area and the second pattern area when the first pattern area and the second pattern area are determined.

According to a 23rd aspect of the present invention, in the image recognition apparatus of the 22nd aspect, the target image data are displayed as luminance components, and the first pattern area and the second pattern area are displayed as color difference components different from each other.

According to a 24th aspect of the present invention, the image recognition apparatus of the 21st aspect comprises an edition unit for overlay-displaying the first pattern area, the second pattern area, and the binarized area on the displayed image of the target image data to edit the first pattern area, the second pattern area, and the binarized area, when the first pattern area, the second pattern area, and the binarized area are determined.

According to a 25th aspect of the present invention, in the image recognition apparatus of the 24th aspect, the target image data are displayed as luminance components, and the first pattern area, the second pattern area, and the binarized area are displayed as color difference components different from each other.

According to a 26th aspect of the present invention, the image recognition apparatus of the 21st aspect comprises an edition unit for overlay-displaying the first pattern area, the second pattern area, the binarized area, and the fixed value area on the displayed image of the target image data to edit the first pattern area, the second pattern area, the binarized area, and the fixed value area, when the first pattern area, the second pattern area, the binarized area, and the fixed value area are determined.

According to a 27th aspect of the present invention, in the image recognition apparatus of the 26th aspect, the target image data are displayed as luminance components, and the first pattern area, the second pattern area, the binarized area, and the fixed value area are displayed as color difference components different from each other.

According to a 28th aspect of the present invention, in the image recognition apparatus of the 21st aspect, the first pattern area and the second pattern area are recorded as relative positions with respect to a pixel to be noted.

According to a 29th aspect of the present invention, in the image recognition apparatus of the 21st aspect, the first pattern area, the second pattern area, and the binarized area are recorded as relative positions with respect to the pixel to be noted.

According to a 30th aspect of the present invention, in the image recognition apparatus of the 21st aspect, the first pattern area, the second pattern area, the binarized area, and the fixed value area are recorded as relative positions with respect to the pixel to be noted.

According to a 31st aspect of the present invention, there is provided an image recognition apparatus which uses the image recognition method of any of the 4th, 6th and 8th aspects, comprising a unit for obtaining the predetermined threshold value by utilizing a luminance distribution of the target image.

According to a 32nd aspect of the present invention, the image recognition apparatus of the 31st aspect comprises a unit for obtaining the predetermined threshold value by utilizing a luminance value which appears most frequently in the luminance distribution of the target image.

DETAILED DESCRIPTION OF THE PREFERRED EMBODIMENTS

Hereinafter, embodiments of an image recognition method and an image recognition apparatus according to the present invention will be described in detail with reference to the drawings.

Embodiment 1

As an example of an image recognition method and an image recognition apparatus according to a first embodiment of the present invention, a process of detecting a microbead (hereinafter, referred to as a bead) of a diameter of 10 μm from a microscope image will be described.

Figure 9:
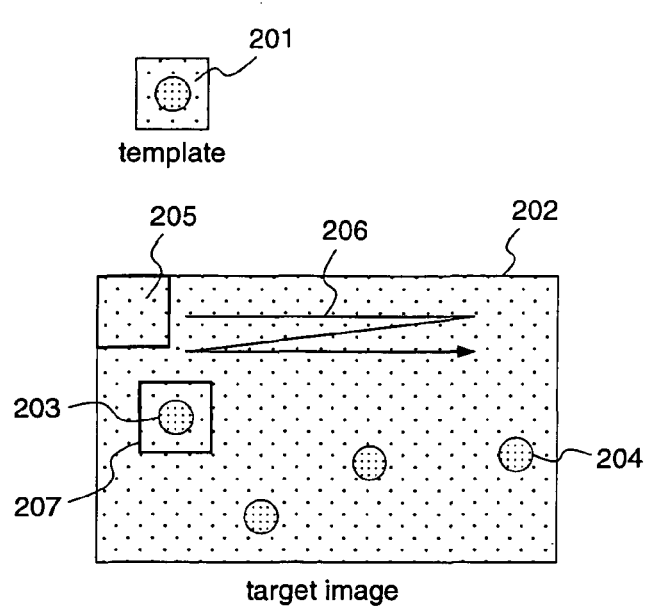
FIG. 9 is a diagram illustrating a process of a typical template matching.
Figure 10:
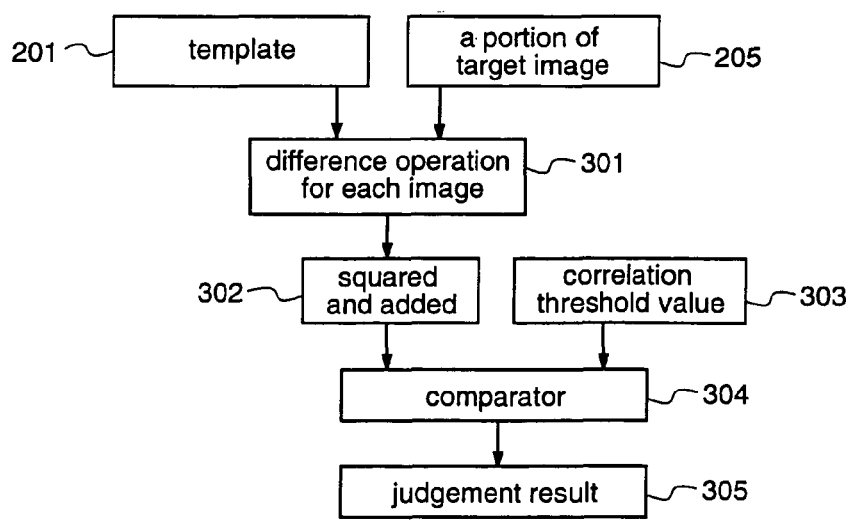
FIG. 10 is a block diagram illustrating a typical template matching.

A target image is designated by the reference numeral 202 shown in FIG. 9, and is a digital image of 1024 pixel width and 768 pixel height in which each pixel has any of 256 gradations as a luminance. As the luminance becomes higher, the luminance value is represented as the higher value. A large number of beads appear in the target image 202, and the purpose is to extract the areas of these beads.

Figure 2:
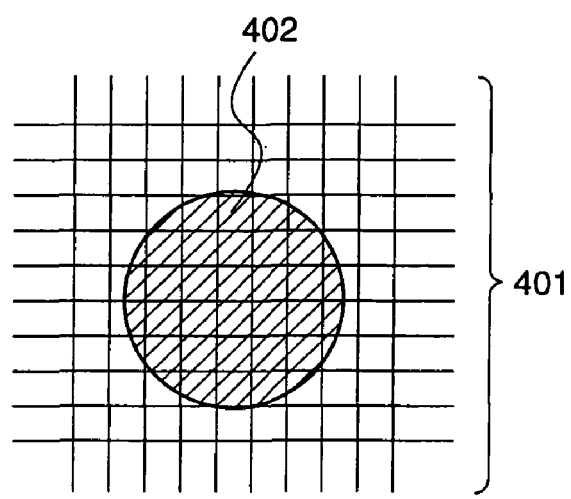
FIG. 2 is a block diagram illustrating a mask pattern used for the image recognition apparatus according to the first embodiment.
Figure 2:
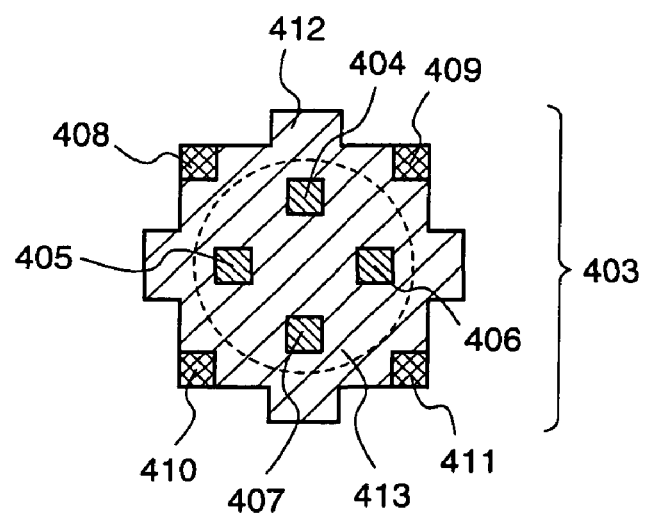

FIG. 2 illustrates an example for setting a pattern area according to the image recognition method of the first embodiment. In FIG. 2, a reference numeral 401 represents an enlarged vicinity of a bead as the target image in which a bead 402 appears dark. The image is photographed when a light is applied from the backside of the image, with the shadow of the bead 402 being photographed. At this time, the absolute values of the luminances of the background part and the bead part are variable due to the influence of such factors as non-uniformity of the application of light. While this variation depends on the position, the bead part appears darker than the background part as the local area.

On the other hand, a reference numeral 403 represents a mask pattern. The reference numerals 404 to 407 represent the first pattern areas and the reference numerals 408 to 411 represent the second pattern areas. Further, a reference numeral 412 represents a binarized area. Moreover, in FIG. 2, a circle 413 represents a frame indicating a size of a bead.

The first pattern areas 404 to 407 are areas for selecting the pixels contained inside the bead 402, while the second pattern areas 408 to 411 are areas for selecting the pixels outside the bead 402. Further, the binarized area 412 is for setting an area close to the bead 402, which area is slightly larger than the bead 402. Hereinafter, the first pattern area, the second pattern area, and the binarized area 412 are referred to as a mask pattern as a whole.

The mask pattern is information indicating positions, and when the mask pattern is superimposed on a position in the target image, each of the first pattern area, the second pattern area and the binarized area 412 indicates a specific area in the target image. Accordingly, the positional relationship among the first pattern area, the second pattern area and the binarized area 412 is relatively fixed, and each of them is recorded as a relative position with respect to a common reference position.

In FIG. 2, the abscissa is x-coordinate and the ordinate is y-coordinate in the image. In a case where the pixel positioned at the second pattern area 410 is a common reference position, the pixel positioned at the first pattern area 407 is recorded as (3, 1), the pixel positioned at the first pattern area 405 is recorded as (1, 3), the pixel positioned at the first pattern area 406 is recorded as (5, 3), and the pixel positioned at the first pattern area 404 is recorded as (3, 5). As to the second pattern area, the pixel positioned at the second pattern area 410 is recorded as (0, 0), the pixel positioned at the second pattern area 411 is recorded as (6, 0), the pixel positioned at the second pattern area 408 is recorded as (0, 6), and the pixel positioned at the second pattern area 409 is recorded as (6, 6), and the binarized areas are recorded as (2, −1), (3, −1), (4, −1), (1, 0), (2, 0) . . . . Hereinafter, using this mask pattern, the pattern matching is sequentially performed to extract an image of a bead with the target image 202 being scanned and the reference position being displaced.

Hereinafter, a principle of the pattern matching according to the present invention will be described. According to the present invention, as a relationship between a luminance of a bead and a luminance of a background part, the luminance of the bead is always smaller (darker) than a predetermined threshold value A as compared to the luminance of the background part. While in this embodiment the threshold value A is set to 100, the value may be arbitrarily selected depending on such factors as a kind of bead or illumination condition. Here, in a case where a bead is present at the position 413 in the mask pattern 403, that is, there is matching, the whole first pattern area is surely positioned inside the bead. Therefore, the largest value of the luminances of the pixels positioned at the first pattern areas 404 to 407 indicates any of the luminances of the pixels inside the bead. On the other hand, since the second pattern areas 408 to 411 are positioned in the background part, the smallest value of the luminances of the pixels positioned at the second pattern areas 408 to 411 indicates any of the luminances of the pixels of the background. Accordingly, when the largest value of the luminances of the pixels positioned at the first pattern areas 404 to 407 is MAX (404 to 407) and the smallest value of the luminances of pixels positioned at the second pattern areas 408 to 411 is MIN(408 to 411), MIN(408 to 411)−MAX (404 to 407)≧A. When the relationship in this formula is satisfied, it is judged that there is matching.

In practice, there is a variation in difference between the luminance of the bead and the luminance of the background part, and therefore in a case where when the difference therebetween is approximately 100, a value 50 which is half the difference 100 is used as the threshold value A, a formula of MIN(408 to 411)−MAX (404 to 407)≧A is surely satisfied.

On the other hand, in a case where no bead is present at the position 413 in the mask pattern 403 or in a case where the positions deviate (in a case where there is no matching), the background part is contained in the first pattern area or the bead part is contained in the second pattern area, and therefore MAX (404 to 407) indicates a luminance of the background or MIN(408 to 411) indicates a luminance of the bead and MIN(408 to 411)−MAX(404 to 407)<A. Accordingly, in this case, it is judged that there is no matching.

Hereinafter, the process of performing pattern matching will be described. It is assumed that the mask pattern 403 is superimposed on a position in the target image 202, and MAX(404 to 407) and MIN(408 to 411) at that position are obtained.

Next, MIN(408 to 411)−MAX(404 to 407) is calculated, and the resultant is compared with the threshold value A. In the case of MIN(408 to 411)−MAX(404 to 407)≧A, it is judged that there is matching while in the case of MIN(408 to 411)−MAX(404 to 407)<A, it is judged that there is no matching.

The above-described matching processing is repeated with the position of the mask pattern 403 being displaced with respect to the target image 202, and the whole target image 202 is scanned and thereby the positions of the beads contained in the target image 202 can be extracted.

Figure 1:
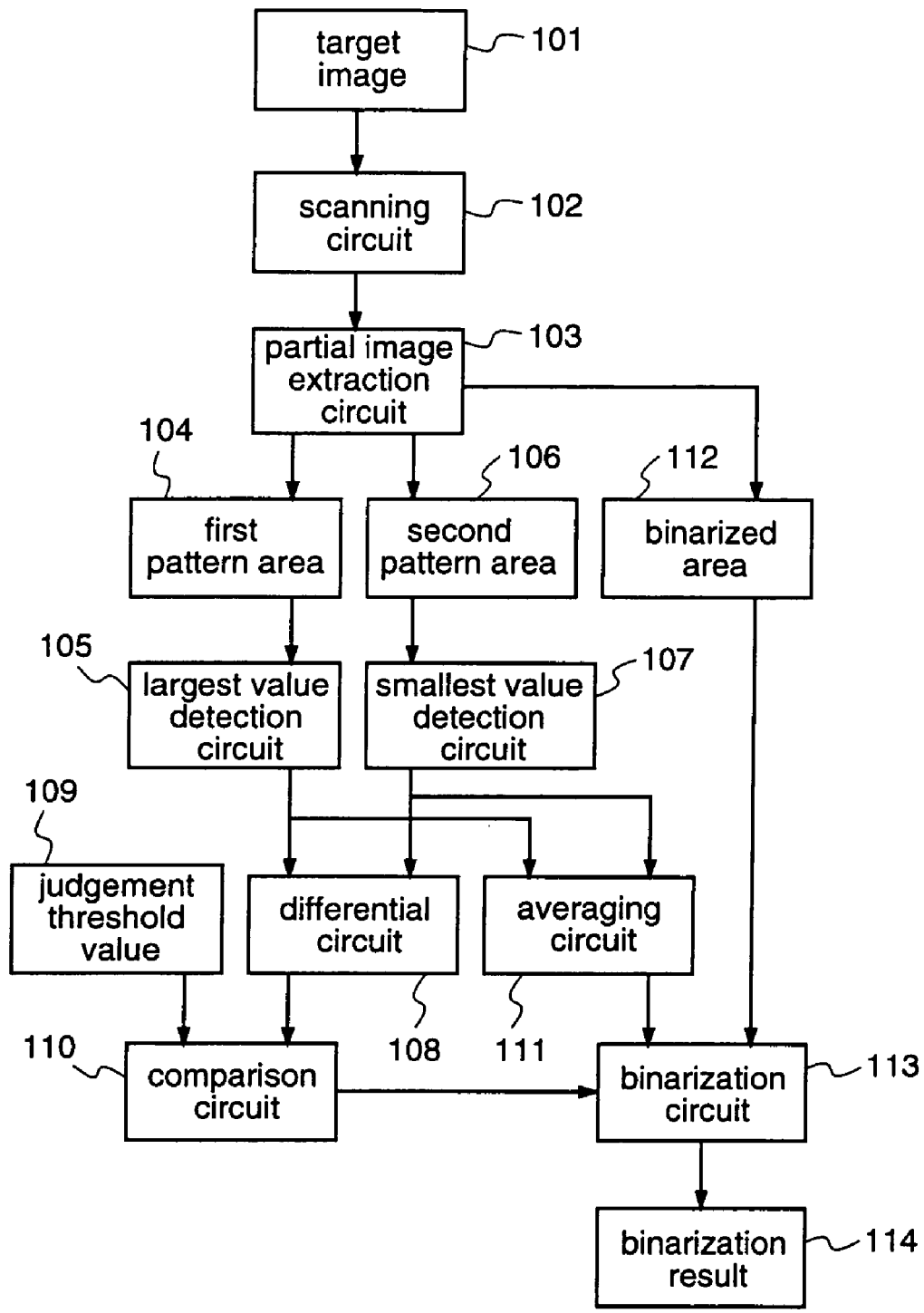
FIG. 1 is a block diagram illustrating an image recognition apparatus according to a first embodiment of the present invention.

Next, a construction of an image recognition apparatus according to the first embodiment of the present invention will be described with reference to FIG. 1. In FIG. 1, a reference numeral 101 denotes a target image to be subjected to the matching processing. When the matching using the mask pattern is performed on the target image 101, since the mask pattern is smaller than the target image, it is necessary to perform the matching processing individually for each small area on which the mask pattern is superimposed with the target image being scanned for the position on which the mask pattern is superimposed (with the reference position of the mask pattern being displaced with respect to the target image). Therefore, a scanning circuit 102 specifies a position to be evaluated in the target image 101, and a partial image extraction circuit 103 extracts the small area in the specified position. The first pattern area is superimposed on the small area 104, and a largest value detection circuit 105 obtains the largest value of the luminances of the pixels in the target image contained in the first pattern area. Similarly, the second pattern area is superimposed on the small area 106, and a smallest value detection circuit 107 obtains the smallest value of the luminances of the pixels in the target image contained in the second pattern area.

A differential circuit 108 subtracts the largest value from the smallest value to obtain the difference, and a comparison circuit 110 compares the difference with a judgement threshold value 109. As a result of the comparison, in a case where the difference is smaller, it is judged that no pattern is present, and no further processing is performed. On the other hand, as a result of the comparison, in a case where the difference is larger, it is judged that a pattern is present, and binarization is performed. An averaging circuit 111 averages the output from the largest value detection circuit 105 and the output from the smallest value detection circuit 107 to obtain a threshold value for the binarization.

A pixel in a range defined by a binarized area 112 is compared with the threshold value by a binarization circuit 113, and a pixel having a smaller luminance than the threshold value is a portion of a detection target to be aimed at, and therefore this pixel is set to "0", and the other pixels are set to 255. This flow of process is performed for the whole target image 101 with the position for judgement and recognition being displaced by the scanning circuit 102, and thereby only the detection target to be aimed at can be set to "0" and the other portion can be set to 255 to obtain a binarization result.

In a case where the whole area of the binarized area 412 for the recognition target 402 shown in FIG. 2 is of, for example, 61 pixels, an operation including 61 subtractions, 61 multiplications, and one addition is required in the prior art. In the first embodiment, because the first pattern area is of 4 pixels and the second pattern area is of 4 pixels, the operation for comparison for obtaining the largest value or the smallest value in each of the areas is required 4−1=3 times. That is, the subtraction is required 3×2=6 times, and the subtraction for obtaining the relationship in magnitude is required once, and therefore the operation including 7 subtractions in total is required. Thereby, the operation for 123−7=116 times, that is, approximately 93 percent of operation, can be eliminated As described above, in the image recognition method and the image recognition apparatus according to the first embodiment, a mask pattern including a lower luminance area, a higher luminance area, and a binarized area is used. In a case where the lightest pixel in the lower luminance area is still darker than the darkest pixel in the higher luminance area, the target is recognized as being detected. Therefore, when an image of x×y pixels is searched, (x×y+1) operations are performed to complete the processing, thereby enabling the number of operations to be substantially reduced as well as a desired pattern to be securely extracted from the image.

Embodiment 2

Next, an image recognition method and an image recognition apparatus according to a second embodiment of the present invention will be described. While in the first embodiment, a conceptual construction and operation according to the present invention is described, a more specific embodiment will be described next.

Figure 3:
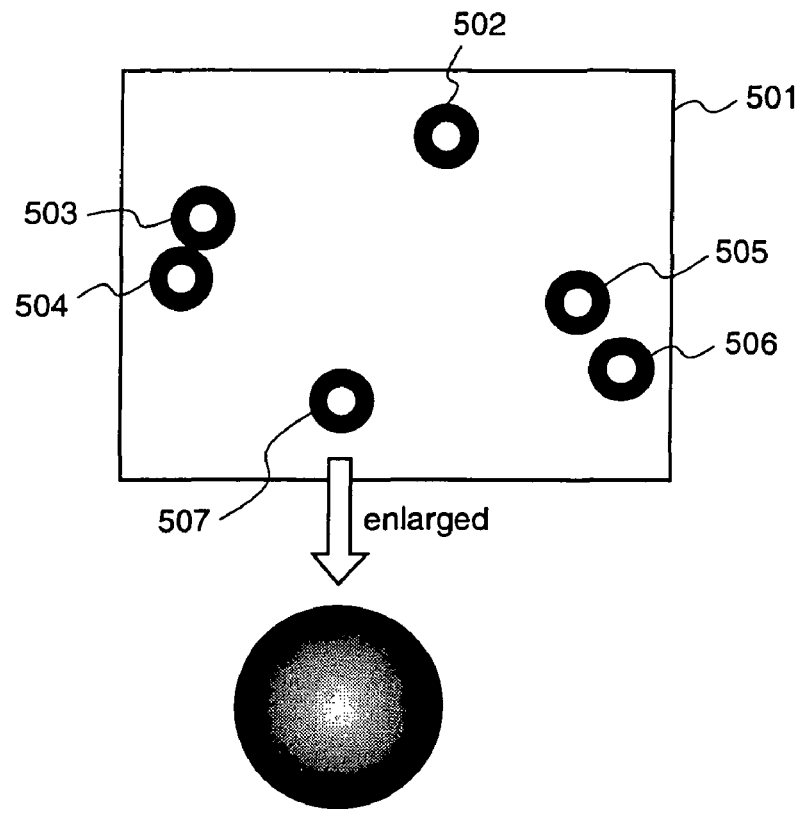
FIG. 3 is a diagram illustrating an image of a target image to be processed by the image recognition apparatus according to a second embodiment of the present invention.

FIG. 3 shows a target image. The upper part of FIG. 3 shows a target image 501 photographed by a microscope and a plurality of beads appear inside. The target image 501 is 640 pixels wide and 480 pixels high in the image, and each pixel has any of 256 gradations ranging from 0 to 255. As a frame of reference of the image, the upper left corner is (0, 0), and the right direction is the plus direction of x-axis while the downward direction is the plus direction of y-axis in the image. Thereby, when a pixel in the lower right in the image is represented as a coordinate, it is (639, 479).

While some hundreds of beads appear in an actual target image, 6 pieces of beads of 502 to 507 appear in the target image 501 as an example for simplifying the description. The part below the image shown in FIG. 3 shows an enlarged bead, and the bead has a much lighter area at its center portion. This is because a bead is made of translucent acryl and when a light is applied from the back, the bead functions as a lens and the light is focused on the center portion and the center portion becomes very light. Further, the light is bent and does not reach the periphery part of the bead, and therefore the periphery part is very dark.

What is to be performed on the target image 501 in the image processing is two, that is, to count the total number of beads and to obtain an intra-bead area of an independent bead. An independent bead is referred to as a bead which is apart from another bead by a certain distance or more, and they are beads 502 and 507 in FIG. 5. Since the bead 503 contacts the bead 504, they are not independent beads, and the beads 506 and 507 are close to each other, and therefore they are not independent beads, either.

In this example, a bead which is apart from all the other beads by 2 or more pixels is referred to as an independent bead.

Figure 4:
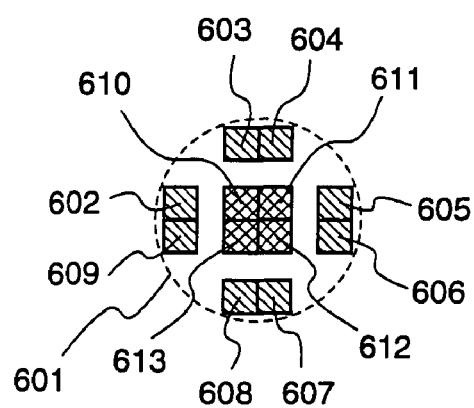
FIG. 4 is a block diagram illustrating a mask pattern for counting beads by the image recognition apparatus according to the second embodiment.

Initially, in a case where the total number of beads is counted, the fact that a higher luminance area of the center of the bead is lighter than that of the periphery part of the bead is utilized. FIG. 4 shows a mask pattern for counting beads. In FIG. 4, a reference numeral 601 represents an outline shape in the case of the bead matching the position of the mask pattern. The reference numerals 602 to 609 represent the first pattern areas and are set as positions of the bead periphery part.

Further, the reference numerals 610 to 613 represent the second pattern areas and are set as positions of the center part of the bead. As a reference for processing, a pixel positioned at the second pattern area 610 is set as a reference position for the mask pattern, and the first pattern areas 602 to 609 are recorded as the relative positions with respect to the pixel positioned at the second pattern area 610, and the second pattern areas 610 to 613 are recorded as the relative positions with respect to the pixel 610 positioned at the second pattern area 610. That is, the first pattern area 602 is represented as (−2, 0), the first pattern area 603 is represented as (0, −2), the first pattern area 604 is represented as (1, −2), the first pattern area 605 is represented as (3, 0), the first pattern area 606 is represented as (3, 1), the first pattern area 607 is represented as (1, 3), the first pattern area 608 is represented as (0, 3), the first pattern area 609 is represented as (−2, 1). The second pattern area 610 is represented as (0, 0), the second pattern area 611 is represented as (1, 0), the second pattern area 612 is represented as (1, 1), and the second pattern area 613 is represented as (0, 1).

When the matching processing is performed on the target image, the mask pattern area is superimposed on the target image, and the judgement is made on the basis of the luminance values of the first pattern area and the second pattern area, and this is sequentially performed with the reference position in the mask pattern being displaced one pixel by one pixel with respect to the target image to make the judgement. This process will be sequentially described.

Initially, the mask pattern area is positioned in the upper left corner in the target image 501. In order to position the mask pattern area so that the mask pattern area is not off the target image 501, the area 610 as a reference position for the mask pattern area is positioned so as to be superimposed on the coordinate (2, 2) in the target image 501. The matching processing at the position is completed, and then the mask pattern area is one pixel displaced to the right with respect to the target image 501. That is, the reference position 610 in the mask pattern area is positioned so as to be superimposed on the coordinate (3, 2) in the target image 501. The matching processing is similarly performed in this state, and thereafter in a like manner the mask pattern area is one pixel displaced to the right with respect to the target image 501 and the matching processing is performed sequentially. This is repeated, and after the reference position 610 in the mask pattern area is positioned so as to be superimposed on the coordinate (636, 2) in the target image 501 and the matching processing is performed. In a case where the mask pattern area is further displaced to the right, the mask pattern area will be off the target image 501, and therefore, the mask pattern area is returned to the left in the image and one pixel displaced downward so as to be positioned on the coordinate (2, 3) in the target image 501. Thereafter, the similar processing is performed, and the matching processing is repeated with the target image 501 being scanned until the reference position 610 in the mask pattern area is positioned so as to be superimposed on the coordinate (636, 476) in the target image 501 and the matching processing is performed.

Next, a process of the matching method at each position will be described. In a case where the reference position 610 in the mask pattern area is superimposed on the position (x, y) in the target image 501 and the matching processing is performed, the coordinate on the target image 501 corresponding to the first pattern area 602 can be obtained as (x−2, y) by adding the coordinate (x, y) on the target image corresponding to the reference position 610 and the coordinate (−2, 0) of the first pattern area 602 with respect to the reference position for each coordinate component. The luminance value of the target image 501 at the coordinate is 602$xy$. In the similar process, the luminance values of the pixels in the target image 501 corresponding to the positions of the first pattern areas 603 to 609 are obtained as 603$xy$ to 609$xy$, respectively. The largest value of the luminance values 602$xy$ to 609$xy$ is MAX (602$xy$ to 609$xy$).

Next, the coordinates of the second pattern areas can be similarly obtained, and the coordinate on the target image 501 corresponding to the second pattern area 610 can be obtained as (x, y) by adding the coordinate (x, y) on the target image corresponding to the reference position 610 and the coordinate (0, 0) of the reference position 610 with respect to the reference position for each coordinate component. The luminance value of the target image 501 at the coordinate is 610$xy$. In the similar process, the luminance values of the pixels in the target image 501 corresponding to the positions of the second pattern areas 610 to 613 are obtained as 610$xy$ to 613$xy$, respectively. The smallest value of the luminance values 610$xy$ to 613$xy$ is MIN(610$xy$ to 613$xy$). In a case where a difference value obtained by MIN(610$xy$ to 613$xy$)−MAX(602$xy$ to 609$xy$) using the values obtained as described above is equal to or larger than a specific offset amount (=A), it is judged that a bead is present. The offset amount A which is a judgement reference at this time is obtained as follows.

Figure 5:
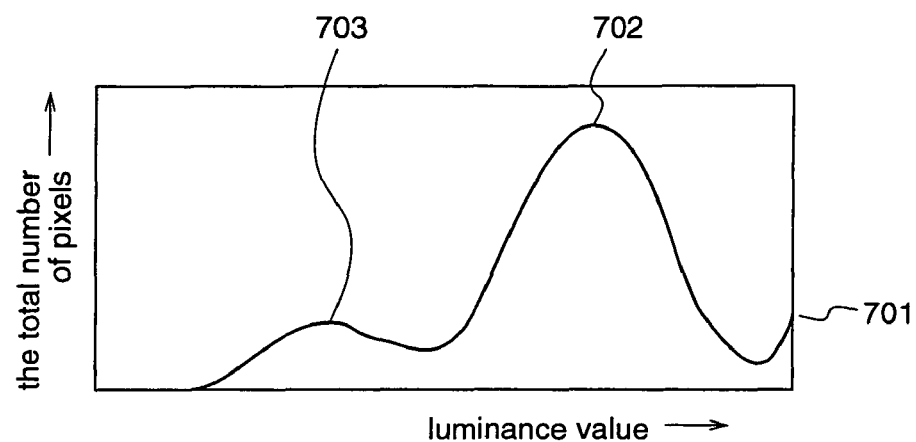
FIG. 5 is a diagram illustrating a luminance histogram of a target image for the image recognition apparatus according to the second embodiment.

FIG. 5 shows a luminance distribution for the target image. The abscissa axis represents luminance values in the image and the luminance becomes lower toward the left while the luminance becomes higher toward the right. The ordinate axis represents the total number of pixels for each luminance. In FIG. 5, a reference numeral 701 represents a portion at which the pixels of the center parts of the beads are distributed, and the center part is generally very light and thereby saturated in luminance, and belongs to the highest luminance part. A reference numeral 702 represents a portion at which the pixels of the background part are distributed, and this part has the largest number of pixels. A reference numeral 703 represents a portion at which the pixels of the parts which are periphery parts of the beads are distributed. Originally, it is desirable to obtain the offset amount between the bead periphery parts and the bead center parts on the basis of the difference between the luminance value of the area 701 and the luminance value of the area 703. In an actual target image, however, there may be a case where the part of the valley cannot be discriminated due to the continuous change as well as a case where three peaks appear as shown in FIG. 5, and therefore it is sometime difficult to obtain the position for 703. On the other hand, while the relationship between the position 702 and the position 703 changes according to an intensity of a light, the ratio therebetween is constant, and the position for 703 is indirectly obtained by obtaining the position for 702. That is, since the position for 702 is a position at which the number of pixels has the largest value in the histogram, the histogram for the whole target image is created and thereafter the position at which the pixels appear most frequently is obtained as the position for 702. The luminance value at the obtained position for 702 is B. It is empirically known that the position for 703 is a position at which its luminance value is $\frac{2}{5}$ of the luminance value at the position for 702, and therefore the luminance value of 703 is $\frac{2}{5}$*B. Further, while the luminance is often saturated at the position 701 and is the largest luminance, there may be other cases, and therefore the frequencies of pixels are added from the higher luminance side in the histogram, and the luminance at which the number of pixels is 0.5% of all the pixels is a luminance C for 701.

In other words, among the lower portion area in the histogram, a point on the higher luminance side at which the area is 0.5% of the whole area is the luminance C. The difference between the luminance of the higher luminance side and the luminance of the lower luminance side inside the bead is obtained as C−$\frac{2}{5}$*B, and the offset amount A is obtained using A=$\frac{1}{2}$*(C−$\frac{2}{5}$*B) inclusive of a margin.

Using the above technique, the judgement is made with the mask pattern being displaced one pixel by one pixel, thereby judging whether a bead is present or not. At this time, in a case where it is judged that a bead is present at a position and then the mask pattern is one pixel displaced and the judgement is made again, since the position of the mask pattern is very close to the previous position and the judgement condition is satisfied, it is sometimes judged again that a bead is present. In this case, the judgement condition is satisfied as to the same bead, and in a case where the same bead is counted as another one, the total number of beads is incorrectly counted. Therefore, in order to avoid the double counting, no judgement is made in a range within 4 pixel height and 4 pixel width from the position at which the bead is judged as being present. That is, a square range of 4 pixel height and 4 pixel width from the reference position of the mask pattern is subjected to marking when a bead is judged as being present, and in a case where when the reference position of the mask pattern is displaced, the pixel corresponding to the reference position of the mask pattern is subjected to the marking, no judgement is made. Taking the above-described process, the judgement is made for the whole area in the target image, the number of pixels is incremented in the counter by one every time a bead is judged as being present, thereby enabling the total number of beads contained in the target image to be obtained.

Figure 6:
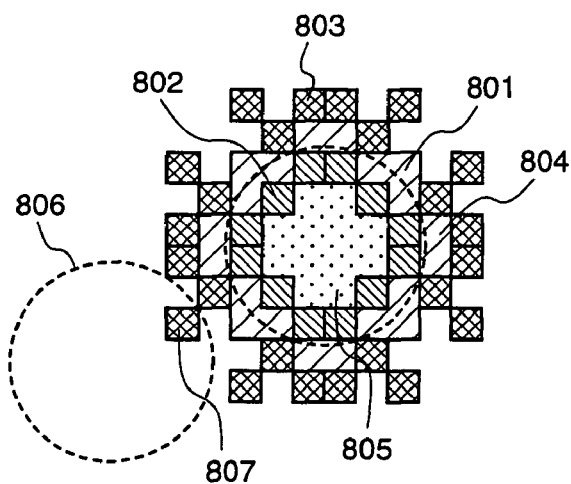
FIG. 6 is a block diagram illustrating a mask pattern for detecting an independent bead area used for the image recognition apparatus according to the second embodiment.

Next, a method for obtaining an area of an independent bead, which are the other contents to be performed on the target image 501 in the image processing, will be described with reference to FIG. 6. FIG. 6 illustrates a mask pattern for detecting an independent bead, and here only a bead which is one or more pixels apart from another bead can be detected. In FIG. 6, a reference numeral 801 represents an outline shape of a bead which is hypothetically indicated. A reference numeral 802 represents a first pattern area. In FIG. 6, all the area shown by the same hatching as that for the part designated by the lead line of 802 represent the first pattern areas. Similarly, a reference numeral 803 represents the second pattern area. Further, a reference numeral 804 represents the binarized area and a reference numeral 805 represents a fixed value area described later. The target image is represented using 256 gradations, and the purpose is that a binary resultant image in which the independent bead areas are represented as 1 and the other areas are represented as 0 is created on the basis of the target image. 0 is initially substituted into all the areas as a resultant image. Further, the pixel indicated by the lead line 802 is set as a mask pattern reference position, and all the pixels in the mask pattern are recorded as relative positions with respect to the mask pattern reference position. As to the binarization, the pattern area is superimposed on the target image and the matching processing is performed on the basis of the luminance values of the first pattern area and the second pattern area, and in a case where it is judged that no independent bead is present, no processing is performed for the resultant image, and in a case where it is judged that an independent bead is present, the binarization result is written for the resultant image. The processing as described above is sequentially performed on the target image with the reference position in the mask pattern being displaced one pixel by one pixel. As the judgement method, in a case where a difference value obtained by subtracting the largest luminance of the luminances contained in the first pattern area from the smallest luminance of the luminances contained in the second pattern area is equal to or larger than a specific offset amount, it is judged that an independent bead is present. The offset amount is set as having a magnitude with which the difference in luminance between the background and the bead periphery part can be discriminated. Here, in FIG. 5, the largest value 702 in the histogram is a luminance value of the background part and the luminance value thereof is set as A. The position of the luminance value 703 of the bead periphery part is empirically $2/5*A$, and therefore the difference therebetween is $A-2/5*A=3/5*A$, and the $3/10*A$ inclusive of a margin is set as an offset amount here.

According to the method of the second embodiment, for example, when a bead is positioned at 801, all the first pattern areas 802 are the bead periphery parts, and even the lightest pixel in the first pattern areas is among the darkest pixels on the whole. On the other hand, the second pattern areas 803 are the background parts in a case where another bead is not present in the periphery thereof, and even the darkest pixel in the second pattern area 803 is relatively light on the whole. Therefore, the judgement condition for judging that an independent bead is present is satisfied. On the other hand, for example, in a case where another bead is present at the position of 806, the pixel 807 falls on a bead periphery part. Therefore, the smallest luminance of the luminances contained in the second pattern area 803 is a luminance of the pixel 807, and has almost the same luminance as the luminance of the first pattern area 802, and thereby there is no difference in offset amount therebetween, and it is judged that no independent bead is present.

In a case where an independent bead is judged as being present, the processing for binarization is performed. Initially, "1" is unconditionally allocated to the pixels at the positions corresponding to the fixed value area 805 and the first pattern area 802 for the resultant image. Next, a center value between the largest value of the luminances contained in the first pattern area 802 and the smallest value of the luminances contained in the second pattern are 803 is obtained as a threshold value for the binarization. The luminance values of the respective pixels in the binarized area 804 are compared with the threshold value for the binarization, and "1" is allocated to the pixels at the positions corresponding to the pixels having smaller luminance values than the threshold value for the binarization for the resultant image. Therefore, all the inside pixels are represented as "1", and the resultant image of the boundary part, which is binarized on the basis of the judgement using the threshold value, can be obtained. Further, before the matching processing for judging whether an independent bead is present is performed, when the value of the resultant image at the reference position in the mask pattern is "1", no judgement is made and the mask pattern is displaced to next position, thereby preventing the judgement from being made as to the same bead twice and enabling the processing speed to be improved.

In the technique according to the second embodiment, a precision of recognition is greatly influenced by the setting of the shape of the mask pattern, and therefore it is important to properly set these shapes. Hereinafter, a man machine interface for facilitating the setting of the first pattern area 802, the second pattern area 803, the binarized area 804, and the fixed value area 805, which are constituents of the mask pattern, will be described.

Figure 8:
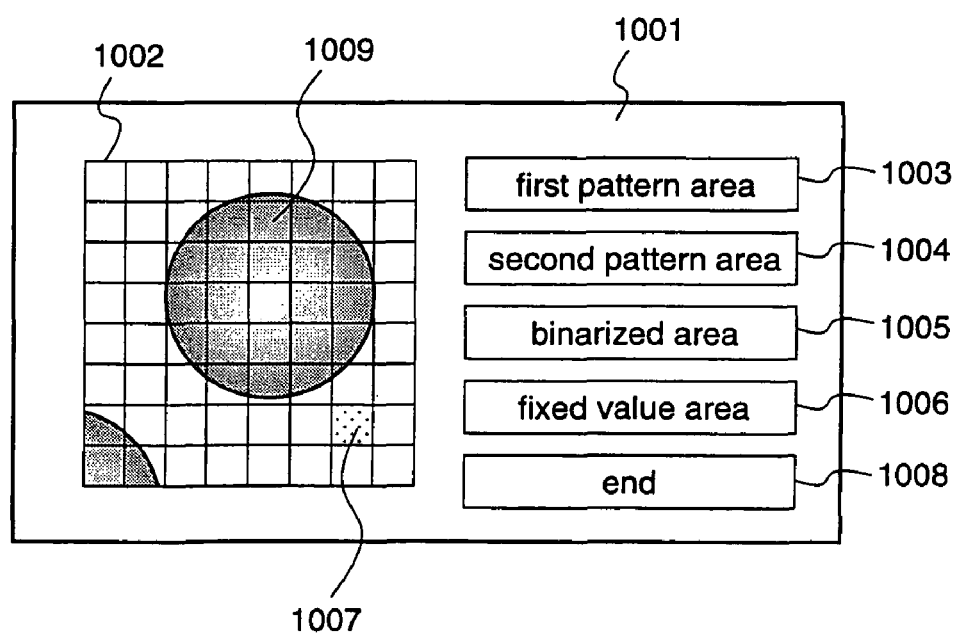
FIG. 8 is a diagram illustrating an image of a mask pattern creation screen used for the image recognition apparatus according to the second embodiment.

In this system, various images are displayed on a monitor screen in a personal computer, and the shape of the mask pattern is being set by clicking the images using a mouse. FIG. 8 is a diagram illustrating an image of a mask pattern creation screen. In FIG. 8, an operation screen is displayed on the monitor screen 1001. The operation screen includes an edition area 1002, a first pattern area setting button 1003, a second pattern area setting button 1004, a binarized area setting button 1005, and a fixed value area setting button 1006, and an end button 1008.

In a case where it is desired to set a first pattern area, when the first pattern area setting button 1003 is clicked using a mouse, a first pattern area setting mode is obtained. When in this state a grid frame 1007 on the edition area 1002 is clicked, the grid frame 1007 is colored, for example, red, and a first pattern area is set. Similarly, the grid frames which the user desires to set as the first pattern area is clicked using the mouse, and thereby the first pattern areas can be successively set. Next, in a case where it is desired to set a second pattern area, when the second pattern area setting button 1004 is clicked using the mouse, the second pattern area setting mode is obtained. When in this state a grid frame on the edition area 1002 is clicked, the grid frame is colored, for example, blue, and the second pattern area is set. Similarly, the positions for the binarized area and the fixed value area are specified by using the mouse, thereby displaying the areas using different colors and enabling the mask pattern to be visually confirmed. When the edition for all the mask patterns is completed, the end button 1008 is pressed, thereby recording the positional information of the respective edited mask patterns.

In performing the edition, when the mask pattern is set with referring to the target image, the setting can be easily performed. That is, in FIG. 6, when the respective mask pattern elements 802 to 805 can be specified with the elements being superimposed on the bead 801 on the target image, the positional relationship among the respective mask patterns can be securely set. Therefore, when a user initially specifies an area which the user desires to refer to in the target image using the mouse, the target image for the portion is enlarged and overlaid on the portion of the edition area 1002 shown in FIG. 8 to be displayed as a reference image 1009. Here, the reference image 1009 is displayed with using black and white 256 gradations. As described above, when the user desires to set the first pattern area, the user selects the first pattern area setting button 1003 using the mouse, and the first pattern area setting mode is obtained, and thereafter the clicked grid frames may be displayed as, for example, red. However, in a case where the grid frame is colored red, the reference image is more hidden with the increase of the clicked grid frames. Therefore, here red color is not completely substituted into the grid frames, and only the color differences are made red with the luminances in the reference image being maintained as they are. That is, the luminance components (brightness) in the reference image are maintained as they are, and only the color differences (tone) are represented according to the mask pattern elements.

An operation process for this transformation will be described as follows. A pixel in the reference image is represented black or white, and therefore R(red component)=G (green component)=B(blue component)=X as the original gradation. The luminance which a human being can perceive by his/her eyes is represented as 0.3R+0.6G+0.1B, and therefore it is necessary that the transformed R, G, and B keep the relationship of 0.3R+0.6G+0.1B=X. Further, in order to make the pixel have a color component near red as much as possible, the setting is such that R−X becomes as large as possible.

Further, G and B are made to have the same value. On the basis of the relationship, in a case where X is 76 or less, R=X/0.3 and G=B=0, and in a case where X is 77 or more, R=255 and G=B=(X−76.5)/0.7. From the above, the grid frame which is set as the first pattern area can be displayed with the luminance components in the reference image being maintained as they are and only the color difference components being changed by using R, G, and B which are obtained in the method described here.

Similarly, when the other mask patterns are set, in order to display the positions which are clicked using the mouse, RGB is obtained so that R−X is set as small as possible for the second pattern area, B−X is set as large as possible for the binarized area, and B−X is set as small as possible for the fixed value area, and the areas are displayed, thereby enabling the respective mask patterns to be set with checking the reference image.

As described above, the image recognition method and the image recognition apparatus according to the second embodiment judges whether a bead is present or absent with using the mask pattern including the first pattern area 802 the whole of which is the bead periphery part, the second pattern area 803 which is background part in a case where the other beads are not present in the periphery, the binarized area 804 positioned between the first pattern area 802 and the second pattern area 803, and the fixed value area 805 which is the center part of the bead, and therefore even when the beads are present adjacent to each other, it is correctly judged that a plurality of beads are present adjacent to each other and the total number of beads can be correctly counted.

Embodiment 3

Next, an image recognition method and an image recognition apparatus according to a third embodiment of the present invention will be described.

Figure 7:
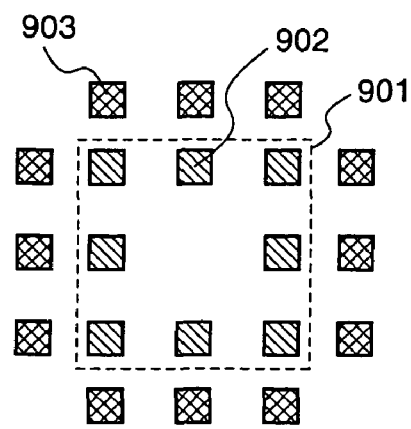
FIG. 7 is a block diagram illustrating a mask pattern used for the image recognition apparatus according to the third embodiment of the present invention.

While in each of the above-described embodiments the pattern presence judgement method in the case of the shape of the discrimination target being round is described, the presence judgement method for the other shapes will be described with reference to the drawings. FIG. 7 illustrates a mask pattern used for detecting the discrimination target having a square shape. A reference numeral 901 represents an outline shape of the square as the discrimination target, and all the areas indicated by the same hatching as that for the part indicated by a lead line 902 are the first pattern areas. Similarly, a reference numeral 903 represents the second pattern area.

When it is judged whether or not a specific pattern is present in the discrimination target, in a case where the smallest luminance of the luminances contained in the second pattern area 903 is larger than the largest luminance of the luminances contained in the first pattern area 902 by more than a specific offset amount, it is judged that the pattern is present, as described for the first and second embodiments. However, in a case where the pattern is square and the square in the target image is turned with respect to the pattern area of the mask pattern at an angle, the correct judgement cannot be made using the mask pattern. Therefore, the mask pattern is positioned at the same position and turned and it is necessary that the judgements as to the presence are repeatedly made at various angles.

In a practical processing, the first pattern area 902 and the second pattern area 903 are set inclusive of a margin on the basis of the outline shape 901, and therefore the judgement may be repeated 6 times in increments of 15 degrees. Further, in order to improve the processing speed, 6 pieces of mask patterns which are turned in increments of 15 degrees are previously provided, and the pattern presence judgement is made using 6 pieces of the mask patterns for each position. In a case where the condition of the presence judgement is satisfied in at least one mask pattern, it can be judged that the pattern is present at that position.

As described above, the image recognition method and the image recognition apparatus according to the third embodiment makes recognition using a mask pattern of a plurality of area patterns adapted to the shape of the target to be recognized which is other than a round shape, and therefore a target to be recognized having a shape other than a round shape can be also detected at high speed and with high precision.

Moreover, in a case where the target to be recognized is rectangular, the mask pattern is turned a predetermined angle to perform recognition, and thereby even when the target to be recognized is not positioned at the predetermined angle, the target can be recognized with high precision.

Then, in each of the above-described embodiments, even when the targets for which it is judged whether the pattern is present or not have multiple sizes, the judgement is made with the mask pattern being enlarged/reduced or the judgement is made by sequentially using a plurality of mask patterns which are previously created in various sizes, thereby judging whether the pattern is present or not.

Further, in a case where the target image contains a lot of noise, there is a possibility that it is judged that no pattern is present due to the influence of the noise even when a pattern is present in the case of using the methods according to each of the embodiments. In this case, when an average value of the luminances of the target image data contained in the second pattern area 903 is larger than an average value of the luminances of the target image data contained in the first pattern area 902 by more than a specific offset amount, it is judged that a specific image pattern is present at the corresponding position in the target image data, thereby enabling the leakage in detection to be prevented.

Moreover, in each of the embodiments, when the smallest value of the luminances of the target image data contained in the second pattern area is larger than a predetermined threshold value as compared to the largest value of the luminances of the target image data contained in the first pattern area, and an average value of the luminances of the target image data contained in the second pattern area is larger than a predetermined threshold value as compared to an average value of the luminances of the target image data contained in the first pattern area, it is judged that a specific image pattern is present at the corresponding position in the target image data, thereby enabling more reliable judgement.

The image recognition method and the image recognition apparatus according to the present invention is useful to various processing apparatus requiring pattern recognition, and more particularly useful to the bioanalyzer since measurement targets in a microscope image can be easily counted and target areas can be easily extracted.

What is claimed is:

1. An image recognition method in which a mask pattern indicating characteristics of an image pattern to be recognized is used to recognize an isolated image isolated from target image data having a plurality of images to be recognized, the target image data having digitized gradations of two or more values and a same configuration and size, said method comprising:

generating, by a mask pattern generation unit, the mask pattern to have a first pattern area which is smaller than the image to be recognized and is not positioned in a center portion, and a second pattern area which is positioned outside the first pattern area, is larger than the image to be recognized, and is smaller than a predetermined distance to adjacent other images to be recognized;

recognizing, by a mask pattern generation unit, an area surrounded by the first pattern area as a fixed area, and an area sandwiched between the first pattern area and the second pattern area as a binarized area;

obtaining, by a largest value detection circuit, a first representative value, which is a largest value of a luminance of a target image data, from the first pattern area;

obtaining, by a smallest value detection circuit, a second representative value, which is a smallest value of a luminance of the target image data, from the second patter area;

judging, by a comparison circuit, that an image to be recognized is present in the target image when a difference between the second representative value and the first representative value is equal to or larger than a predetermined threshold value; and comparing, by a binarization circuit, the target image data in the binarized area with a predetermined threshold value to binarize them when an image to be recognized is judged as being present in the target image.

2. The image recognition method as defined in claim 1, wherein the predetermined threshold value is an intermediate value between the representative value of the luminance of the target image data in the first pattern area and the representative value of the luminance of the target image data in the second pattern area.

3. The image recognition method as defined in claim 1, wherein the predetermined threshold value is an intermediate value between a largest value of luminances of the target image data, which are contained in the first pattern area, and a smallest value of luminances of the target image data, which are contained in the second pattern area.

4. The image recognition method as defined in claim 1, comprising:

binarizing the target image data in the fixed value area so that the target image data have a predetermined one of two values when the image to be recognized is judged as being present in the target image.

5. The image recognition method as defined in claim 1, wherein a portion of the target image data which is not binarized is set to a predetermined one of two values to obtain a binarization result of the whole image.

6. An image recognition apparatus which uses the image recognition method as defined in claim 1 to process an image, comprising:

a display unit for displaying the first pattern area and the second pattern area on a screen; and a position specification unit for determining positions of respective pixels in the first pattern area and the second pattern area on the screen.

7. The image recognition apparatus as defined in claim 6, comprising:

an edition unit for overlay-displaying the first pattern area and the second pattern area on a displayed image of the target image data to edit the first pattern area and the second pattern area when the first pattern area and the second pattern area are determined.

8. The image recognition apparatus as defined in claim 7, wherein the target image data are displayed as luminance components, and the first pattern area and the second pattern area are displayed as color difference components different from each other.

9. The image recognition apparatus as defined in claim 6, comprising:

an edition unit for overlay-displaying the first pattern area, the second pattern area, and a binarized area on a displayed image of the target image data to edit the first pattern area, the second pattern area, and the binarized area, when the first pattern area, the second pattern area, and the binarized area are determined.

10. The image recognition apparatus as defined in claim 9, wherein the target image data are displayed as luminance components, and the first pattern area, the second pattern area, and the binarized area are displayed as color difference components different from each other.

11. The image recognition apparatus as defined in claim 6, comprising:

an edition unit for overlay-displaying the first pattern area, the second pattern area, a binarized area, and a fixed value area on a displayed image of the target image data to edit the first pattern area, the second pattern area, the binarized area, and the fixed value area, when the first pattern area, the second pattern area, the binarized area, and the fixed value area are determined.

12. The image recognition apparatus as defined in claim 11, wherein the target image data are displayed as luminance components, and the first pattern area, the second pattern area, the binarized area, and the fixed value area are displayed as color difference components different from each other.

13. The image recognition apparatus as defined in claim 6, wherein the first pattern area and the second pattern area are recorded as relative positions with respect to a pixel to be noted.

14. The image recognition apparatus as defined in claim 6, wherein the first pattern area, the second pattern area, and a binarized area are recorded as relative positions with respect to a pixel to be noted.

15. The image recognition apparatus as defined in claim 6, wherein the first pattern area, the second pattern area, a binarized area, and a fixed value area are recorded as relative positions with respect to a pixel to be noted.

* * * * *